(12) United States Patent
Nishimura et al.

(10) Patent No.: US 7,715,065 B2
(45) Date of Patent: May 11, 2010

(54) IMAGE PROCESSING APPARATUS AND IMAGE FORMING APPARATUS

(75) Inventors: Isao Nishimura, Saitama (JP); Hiroyuki Nagano, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1039 days.

(21) Appl. No.: 11/355,900

(22) Filed: Feb. 17, 2006

(65) Prior Publication Data

US 2006/0209357 A1 Sep. 21, 2006

(30) Foreign Application Priority Data

Mar. 15, 2005 (JP) ............................ 2005-073461
Dec. 27, 2005 (JP) ............................ 2005-375831

(51) Int. Cl.
*H04N 1/04* (2006.01)

(52) U.S. Cl. ..................... 358/474; 358/501; 358/505; 358/1.9; 358/498; 382/199; 382/165; 348/223.1; 348/70

(58) Field of Classification Search ................ 358/474, 358/1.9, 1.5, 2.1, 501, 505, 512, 515, 518, 358/520, 498, 524, 530, 448, 453, 462, 496; 382/165, 167, 274, 275, 318, 319, 194, 209; 348/70, 223.1

See application file for complete search history.

(56) References Cited

U.S. PATENT DOCUMENTS

| | | | | |
|---|---|---|---|---|
| 6,272,248 B1 * | 8/2001 | Saitoh et al. | ................ | 382/218 |
| 6,633,406 B1 * | 10/2003 | Imaizumi et al. | ........... | 358/1.18 |
| 7,508,552 B2 * | 3/2009 | Touura | ....................... | 358/474 |
| 2002/0114002 A1 * | 8/2002 | Mitsubori et al. | .......... | 358/1.15 |
| 2003/0202193 A1 * | 10/2003 | Yokochi | ...................... | 358/1.9 |
| 2004/0109182 A1 * | 6/2004 | Nagarajan et al. | ............ | 358/1.9 |
| 2005/0005130 A1 * | 1/2005 | Okigami | ...................... | 713/183 |
| 2006/0066919 A1 * | 3/2006 | Saka et al. | ................... | 358/474 |
| 2006/0098248 A1 * | 5/2006 | Suzuki et al. | ............... | 358/496 |
| 2006/0209348 A1 * | 9/2006 | Tabata | ....................... | 358/3.28 |
| 2006/0209357 A1 * | 9/2006 | Nishimura et al. | .......... | 358/448 |

FOREIGN PATENT DOCUMENTS

| | | |
|---|---|---|
| JP | 2001-36752 | 2/2001 |
| JP | 3330392 | 7/2002 |
| JP | 2004-104718 | 4/2004 |

* cited by examiner

*Primary Examiner*—Negussie Worku
(74) *Attorney, Agent, or Firm*—Oblon, Spivak, McClelland, Maier & Neustadt, L.L.P.

(57) ABSTRACT

An image processing apparatus includes a detecting unit that detects whether image data for each of the lines in generated image information is chromatic or achromatic; and a determining unit that determines whether the original is chromatic or achromatic based on a detection result of the detecting unit for a first area of the image information, excluding a detection result for a predetermined second area of the image information, the predetermined second area including an end line among the lines in a scanning direction of the original.

21 Claims, 16 Drawing Sheets

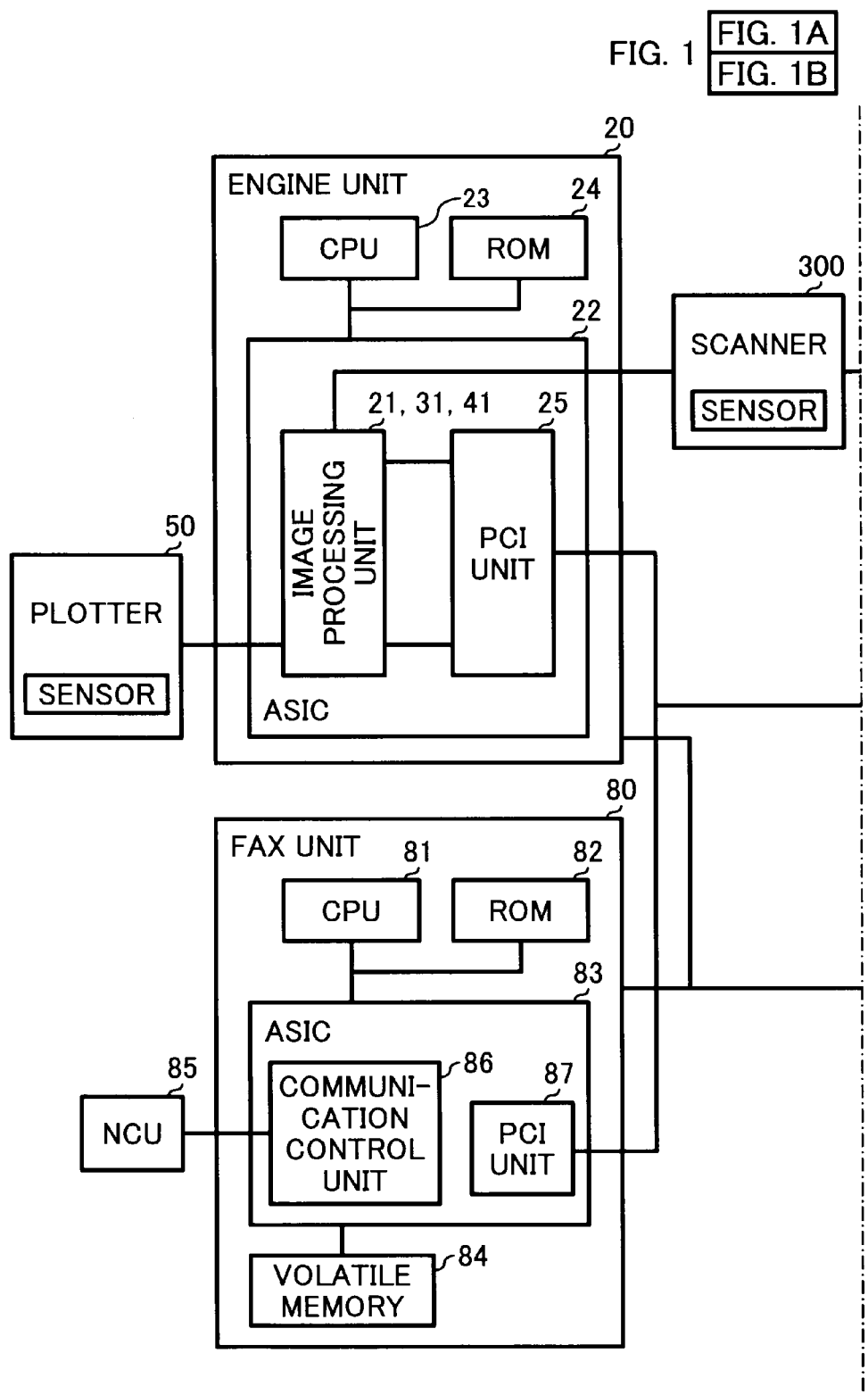

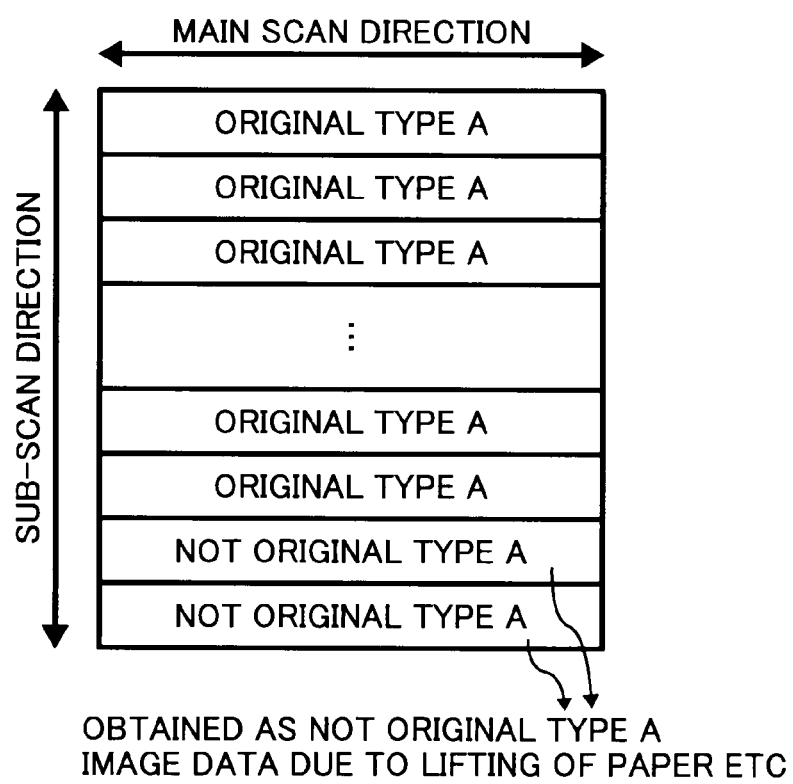

IMAGE PROCESSING APPARATUS AND IMAGE FORMING APPARATUS

CROSS-REFERENCE TO RELATED APPLICATIONS

The present document incorporates by reference the entire contents of Japanese priority documents, 2005-073461 filed in Japan on Mar. 15, 2005 and 2005-375831 filed in Japan on Dec. 27, 2005.

BACKGROUND OF THE INVENTION

1. Field of the Invention

The present invention relates to an image processing apparatus and an image forming apparatus having an automatic color selection (ACS) function.

2. Description of the Related Art

Some image forming apparatuses have an ACS function. For example, a color image forming apparatus disclosed in Japanese Patent Application Laid Open No. 2004-104718 includes a unit that stores position information of an original conveying member within an original conveying device relative to an image input unit, to prevent an erroneous ACS determination when an image is input from a see-through type original feeder, and to determine a color of the original image suited to a recorded image to be output. A sensor, which is provided in front of the image input unit within the original conveying device, detects a position of an original relative to the image input unit. A color-area determining unit determines whether an area in an input image is chromatic or achromatic, based on input image signals. A determination inhibiting signal, which inhibits the color-area determining unit from making an erroneous determination, calculates a position of the original conveying member within the original conveying device relative to a conveyed original from the position information of the original conveying member within the original conveying device relative to the image input unit, sensor information detecting the position of the original, and a linear velocity in the sub scan direction. The determination inhibiting signal is generated when the original enters and leaves the original conveying member within the original conveying device.

Other related techniques are disclosed in Japanese Patent Application Laid Open Nos. H6-014205 and 2001-036752.

When making a determination in the ACS for a regular-sized original, a valid image size in the sub scan direction is defined, so that a chromatic detection area of the original is counted and a chromatic detection signal is masked. However, when the original is of an irregular size, or when originals of different sizes are mixed, an end of the original in the sub scan direction is not defined. Thus, a determination area cannot be set in advance. Furthermore, when the end edge of an original is lifted when passing through an automatic document feeder (ADF), input image data might change to chromatic color data even when the original only includes achromatic color data, which results in an erroneous detection. The image forming apparatus disclosed in Japanese Patent Application Laid Open No. 2004-104718 prevents an erroneous ACS determination when an image is input from the original feeder and determines a color of the original image suited to a recorded image to be output.

This conventional image forming apparatus counts the time from a conveying roller to a reading position, and generates a determination inhibiting signal for the corresponding area. However, variations occur when machine parts are assembled. Further, application specific integrated circuits (ASIC) require more input pins, which increases the cost.

SUMMARY OF THE INVENTION

It is an object of the present invention to at least solve the problems in the conventional technology.

According to an aspect of the present invention, an image processing apparatus includes a conveying unit that conveys an original; a scanning unit that scans conveyed original line by line to generates image information including image data corresponding to a plurality of the lines; a detecting unit that detects whether image data for each of the lines in generated image information is chromatic or achromatic; and a determining unit that determines whether the original is chromatic or achromatic based on a detection result of the detecting unit for a first area of the image information, excluding a detection result for a predetermined second area of the image information, the predetermined second area including an end line among the lines in a scanning direction of the original.

According to another aspect of the present invention, an image processing apparatus includes a conveying unit that conveys an original; a scanning unit that scans conveyed original line by line to generates image information including image data corresponding to a plurality of the lines; a detecting unit that detects whether image data for each of the lines in generated image information is blank or not blank; and a determining unit that determines whether the original is blank or not blank based on a detection result of the detecting unit for a first area of the image information, excluding a detection result for a predetermined second area of the image information, the predetermined second area including an end line among the lines in a scanning direction of the original.

According to still another aspect of the present invention, an image processing apparatus includes a conveying unit that conveys an original; a scanning unit that scans conveyed original line by line to generates image information including image data corresponding to a plurality of the lines; a detecting unit that detects whether image data for each of the lines in generated image information is a predetermined original type or not a predetermined original type; and a determining unit that determines whether the original is a predetermined original type or not a predetermined original type based on a detection result of the detecting unit for a first area of the image information, excluding a detection result for a predetermined second area of the image information, the predetermined second area including an end line among the lines in a scanning direction of the original.

According to still another aspect of the present invention, an image forming apparatus includes an image processing apparatus according to the above aspects.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 15 depicts another example of an original read by a scanner according to the third embodiment.

DETAILED DESCRIPTION OF THE PREFERRED EMBODIMENTS

Exemplary embodiments of the present invention will be described below with reference to accompanying drawings. The present invention is not limited to these embodiments.

Figure 1B:
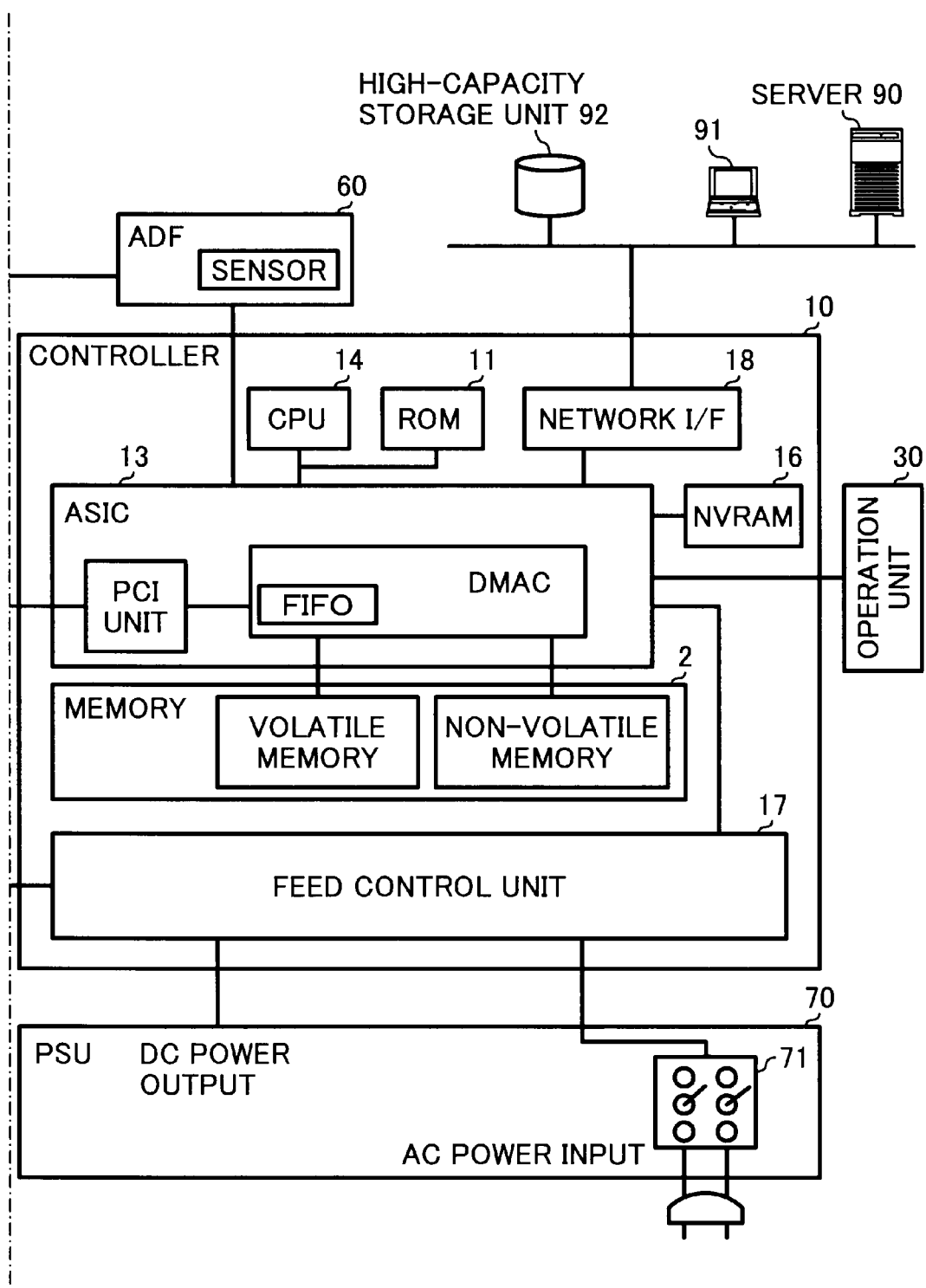
FIG. 1 is a block diagram of a digital multifunction peripheral as a color image forming apparatus according to embodiments of the present invention.

FIG. 1 is a block diagram of a circuit configuration of a digital multifunction peripheral as a color image forming apparatus according to embodiments of the present invention.

Figure 2:
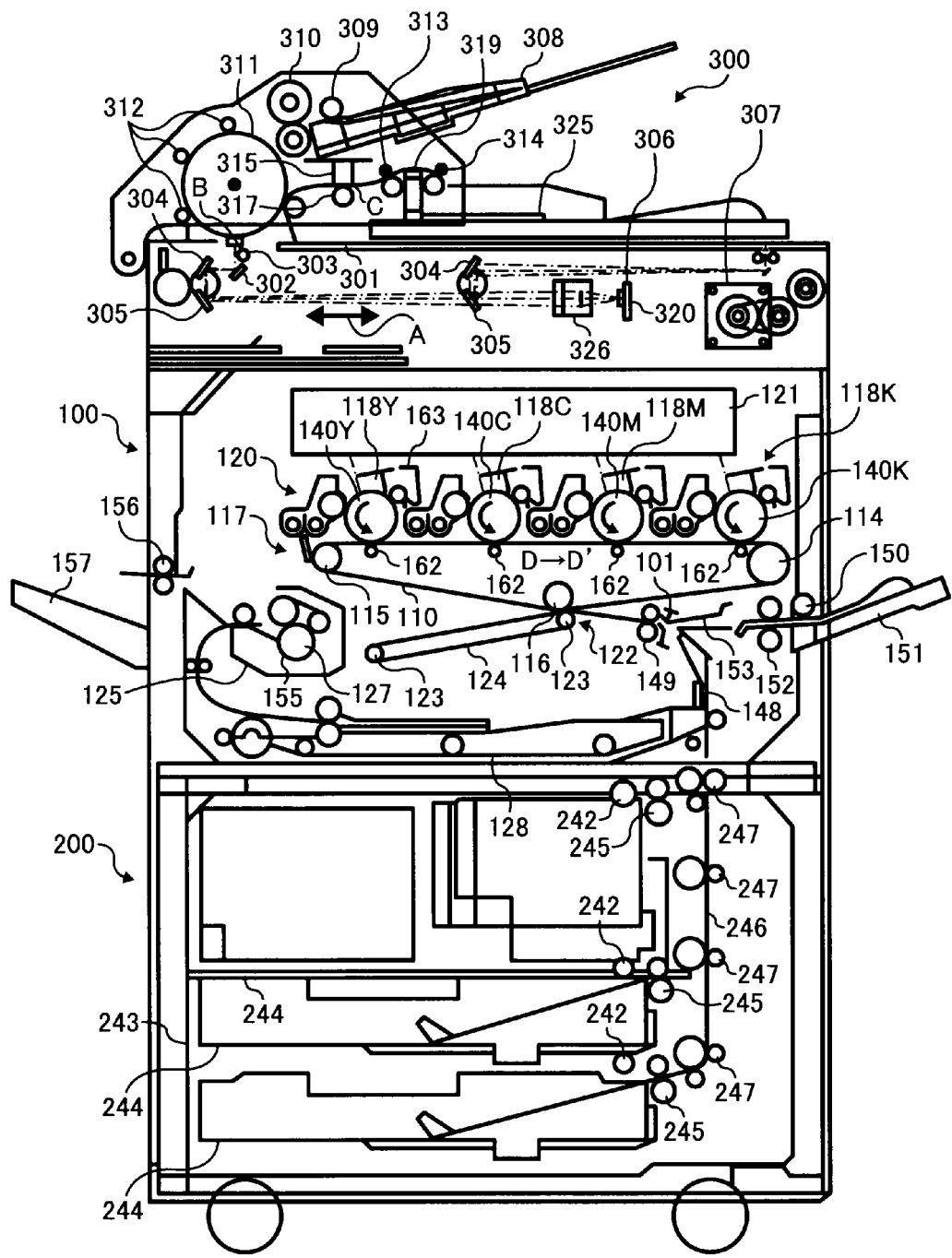
FIG. 2 is a schematic side view of the image forming apparatus shown in FIG. 1.

FIG. 2 is a schematic of the image forming apparatus shown in FIG. 1. The image forming apparatus includes a copier 100, a paper feeding table 200 on which the copier 100 is mounted, and a scanner 300 including an ADF attached to the copier 100.

In the center of the copier 100 is provided an intermediate transfer member 110 that is an endless belt. The intermediate transfer member 110 includes a base layer made of fluorine resin with low elasticity or a rubber material with high elasticity and a cloth with very low elasticity, an elastic layer provided on the base layer, and a smooth coating layer coated on the elastic layer. The elastic layer is made of fluorine rubber or acrylonitrile-butadiene copolymer rubber, and the coating layer is made of fluorine resin, for example.

The intermediate transfer member 110 is wound around a first support roller 114, a second support roller 115, and a third support roller 116, and rotates in a direction indicated by an arrow D→D'. An intermediate-transfer-member cleaning device 117 is provided on the left of the second support roller 115 for removing toner remaining on the intermediate transfer member 110 after an image transfer operation.

A tandem-image forming unit 120 is located above the intermediate transfer member 110 and between the first support roller 114 and the second support roller 115. The tandem-image forming unit 120 includes four image forming units 118Y, 118C, 118M, and 118K horizontally arranged along the direction of rotation, each of which forming an image of one color of yellow (Y), cyan (C), magenta (M), and black (K), respectively. An exposing device 121 is provided above the tandem-image forming unit 120. A letter next to a reference numeral represents a color: Y denotes yellow, C denotes cyan, M denotes magenta, and K denotes black.

A secondary transfer device 122 is provided on the other side of the intermediate transfer member 110, opposite to the tandem-image forming unit 120. The secondary transfer device 122, including an endless second transfer belt 124 wound around two rollers 123, is pressed against the third support roller 116 via the intermediate transfer member 110 to transfer an image from the intermediate transfer member 110 onto transfer paper.

A fixing device 125 that fixes the transferred image on the transfer paper is provided downstream in a transfer paper conveying direction of the secondary transfer device 122. The fixing device 125 includes a pressurizing roller 127 pressed against an endless fixing belt. The secondary transfer device 122 also has a function of conveying the transfer paper, onto which an image is transferred, to the fixing device 125. A transfer roller or a non-contact charger can be provided instead of the secondary transfer device 122; however, it would be difficult to also include the function of conveying the transfer paper.

A transfer-paper reversing device 128, which reverses transfer paper when recording images on both sides, is provided below the secondary transfer device 122 and the fixing device 125, parallel to the tandem-image forming unit 120.

The scanner 300 simultaneously reads both sides of an original by a see-through method. A first carrier and a second carrier move in a sub scan direction to read an image when the original is a book. However, when reading both sides of an original, the first carrier is stopped at a reading position far upstream in an original conveying direction of a contact glass 301 to read a front side of the original, as the original passes the contact glass 301. A back side of the original is read by a contact image sensor (CIS) that is provided slightly downstream in the original conveying direction than the reading position. The front and back sides are read simultaneously as the original is conveyed.

A lamp 303 configured integrally with a first mirror 302 (the first mirror 302 and the lamp 303 are mounted on the first carrier) irradiates a light onto an original placed on the contact glass 301. A light reflected from the original is scanned from the first mirror 302 by a second mirror 304 and a third mirror 305 configured integrally (the second mirror 304 and the third mirror 305 are mounted on the second carrier). The light is then focused by a lens 326, irradiated onto an image formation side of a charge-coupled device (CCD) 306, and subjected to photoelectric conversion. A carrier motor 307 drives the first carrier and the second carrier that are movable in directions indicated by an arrow A. An original on placed on an original tray 308 is sent through a pick-up roller 309, a pair of registration rollers 310, a conveying drum 311, and conveying rollers 312 to a reading position B, sent through a pair of conveying rollers 313 and a pair of paper discharge rollers 314, and discharged onto a paper discharge tray 325.

The lamp 303, which is moved near the reading position B, irradiates a light to the original as the original passes the reading position B. The reflected light is scanned by the first mirror 302, and the second mirror 304 and the third mirror 305. The reflected light then is focused by the lens 326, irradiated onto the CCD 306, and subjected to photoelectric conversion. The pick-up roller 309 and the pair of registration rollers 310 are driven by a feeding motor (not shown), and the conveying drum 311, the conveying rollers 312, the conveying rollers 313, and the paper discharge rollers 314 are driven by a conveying motor (not shown).

A CIS 315 is set at a reading position C. The CIS 315 includes an LED that is a light source, a lens, and a sensor element (not shown). When an original 319 passes the reading position C, a side opposite to the side read at the reading position B (back side) is irradiated by the LED of the CIS 315. The reflected light is focused by the lens on the CIS 315, irradiated onto the sensor element of the CIS 315, and subjected to photoelectric conversion. A white roller 317 is provided opposite to the CIS 315 on the other side of the original 319, which is used as a white member for shading correction.

When taking a copy, the original 319 is set on the original tray 308. Alternatively, the ADF of the scanner 300 is opened, the original is set on the contact glass 301, and the ADF is closed to hold down the original. When a start button (not shown) is pressed, the original 319 set in the original tray 308 is conveyed to the reading position B to be read by the see-through method. When the start button is pressed when the original 319 set on the contact glass 301, the first carrier and the second carrier immediately start moving. A light is irradiated by the lamp 303 to the original, reflected from the original, reflected by the first mirror 302, reflected by the second mirror 304 and the third mirror 305, focused by the lens 326, and irradiated on the CCD 306. Accordingly, the contents of the original is read. Reference numeral 320 denotes a substrate on which the CCD 306 is attached.

When the start button is pressed, a driving motor rotates the first support roller 114, which is a driving roller, and the second support roller 115 and the third support roller 116, which are subordinate rollers, are rotated, thereby rotating the intermediate transfer member 110. At the same time, each of the image forming units 118 rotates a corresponding photosensitive drum 140, and forms a one color image of black, yellow, magenta, and cyan, respectively. As the intermediate transfer member 110 is rotated, each of the color images is sequentially transferred onto the intermediate transfer member 110 on top of each other to form a full-color image.

When the start button is pressed, one of paper feeding rollers 242 is selectively rotated to deliver transfer paper from one of a plurality of stages of paper feeding cassettes 244 in a paper bank 243. A sheet of the delivered transfer paper is separated from other sheets by a separating roller 245 and conveyed into a paper feeding path 246, conveyed by conveying rollers 247 to a paper feeding path 148 in the copier 100, and abutted against registration rollers 149. Transfer paper can be fed from a manual feed tray 151. A paper feeding roller 150 is rotated to deliver the transfer paper from the manual feed tray 151. A sheet of the delivered transfer paper is separated from other sheets by a separating roller 152 and conveyed into a manual paper feeding path 153, and abutted against the registration rollers 149.

The registration rollers 149 are rotated in synchronization with the full-color image on the intermediate transfer member 110 to send the transfer paper in between the intermediate transfer member 110 and the secondary transfer device 122. The full-color image is transferred to the transfer paper at the secondary transfer device 122 so that the full-color image is recorded on the transfer paper.

The transfer paper onto which the image is transferred is sent to the fixing device 125 by the secondary transfer device 122. The fixing device 125 applies heat and pressure to fix the image onto the to the transfer paper. A switching pawl 155 is then switched so that the transfer paper is discharged by discharge rollers 156 and stacked onto a paper discharge tray 157. The switching pawl 155 can be switched another way so that the transfer paper is conveyed to the transfer-paper reversing device 128 where the transfer paper is reversed, conveyed again to the transfer position so that an image is recorded on the back side, and then discharged on the paper discharge tray 157 by the discharge rollers 156.

After the image transfer operation, toner remaining on the intermediate transfer member 110 is removed by the intermediate-transfer-member cleaning device 117 to prepare a next image forming operation by the tandem-image forming unit 120. The registration rollers 149 are generally grounded; however, a bias can also be applied to remove paper dust of the transfer paper.

In the tandem-image forming unit 120, each image forming unit 118 includes a charging device, a developing device, a primary transfer device 162, a photosensor cleaning device, and a discharging device arranged around the corresponding photosensitive drum 140.

Referring back to FIG. 1, the circuit configuration of the copier 100 includes a controller 10, the scanner 300 that reads an original image on the contact glass 301 and converts it into image data, a plotter 50 that forms an image on recording paper by an electrophotographic process, an engine unit 20 that controls the scanner 300 and the plotter 50, an operation unit 30 including various switches and a display unit, an ADF 60, a power supply unit (PSU) 70 that receives external alternating current (AC) power and outputs direct current (DC) power, and a facsimile (FAX) unit 80 that communicates image data through a FAX network. The controller 10, the engine unit 20, and the fax unit 80 are interconnected by a peripheral component interconnect (PCI) bus. These units can be connected by a local bus. In the embodiments, the scanner 300 is configured to include the ADF 60.

The engine unit 20, which controls the scanner 300 and the plotter 50, includes an ASIC 22, a central processing unit (CPU) 23, and a read only memory (ROM) 24. The ASIC 22 includes an ACS, a filter, an image processing unit 21 that performs image processing such as error diffusion and y conversion, and a PCI unit 25 that communicates data through a PCI bus. The CPU 23 controls all units of the engine unit 20, and the ROM 24 stores programs executed by the CPU 23 and control data. The image processing unit 21 is connected to a first memory (not shown) provided outside the engine unit 20, and image data is stored in and read from the first memory. The fax unit 80 includes a CPU 81 that controls all units of the fax unit 80, a ROM 82 that stores programs and control data, an ASIC 83, a volatile, memory 84 used for accumulating image data received from the FAX network, and a network control unit (NCU) 85 that controls the network. The ASIC 83 includes a communication control unit 86 that communicates data between the FAX network through the NCU 85 and a PCI unit 87 that communicates data through the PCI bus.

The controller 10 controls all units of the copier 100, rendering, communication, and input from the operation unit 30. A server 90, a personal computer (PC) terminal 91, and a high-capacity storage unit 92 are connected to the controller 10 through a network interface (I/F) 18 via a local area network (LAN). A ROM 11 that stores programs and control data, a second memory 2 that stores data, an ASIC 13, a CPU 14, a nonvolatile random access memory (NVRAM) 16 that stores control data including ID, and a feed control unit 17 that controls power feed to each unit. The feed control unit 17 monitors an AC power switch 71, and stores a flag expressing a status of the AC power switch 71 in the NVRAM 16. The CPU 14 monitors the flag. Power is turned on/off when a user operates the AC power switch 71. The units are connected by the PCI bus; however, they can be connected by a local bus that can be controlled.

Figure 3:
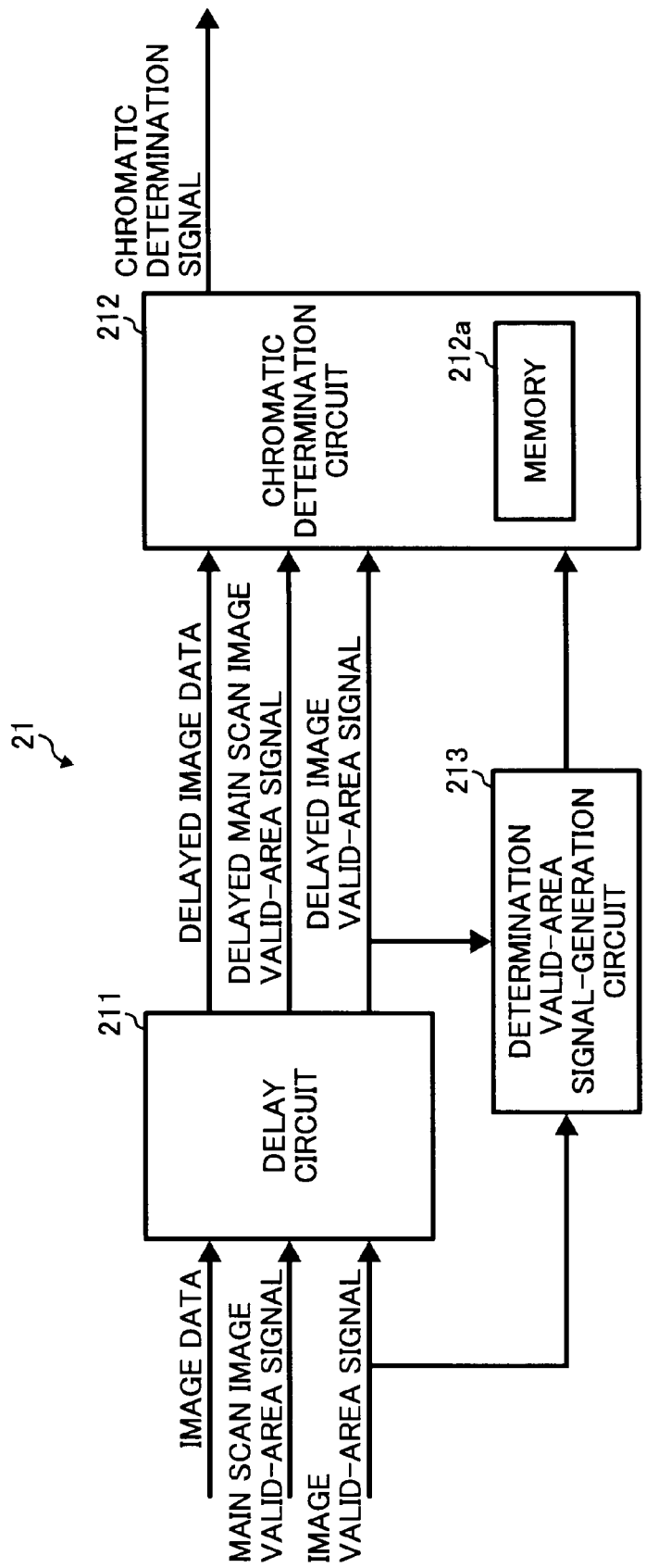
FIG. 3 is a detailed block diagram of an image processing unit shown in FIG. 1 according to a first example of a first embodiment of the present invention.

FIG. 3 is a block diagram of the image processing unit 21 according to a first example of a first embodiment of the present invention. The image processing unit 21 includes a delay circuit 211, a chromatic determination circuit 212, a memory 212a, and a determination valid-area signal-generation circuit 213.

The delay circuit 211 receives image data, a main-scan image valid-area signal, and an image valid-area signal, and outputs these at a delayed timing corresponding to predetermined bits. The determination valid-area signal-generation circuit 213 generates a determination valid-area signal from the image valid-area signal and a delayed image valid-area signal. Specifically, a logical AND operation is performed between the image valid-area signal and the delayed image valid-area signal to generate the determination valid-area signal.

The chromatic determination circuit 212 receives delayed image data, a delayed main-scan image valid-area signal, and a delayed image valid-area signal from the delay circuit 211, and determines whether one line of image data of the delayed image data in a main scan direction is a chromatic color or an achromatic color. The color can be determined not only by one line, but can be determined by a plurality of lines. The chromatic determination circuit 212 stores a determination result in the memory 212a. It is determined whether an original is a chromatic color or an achromatic color from a determination result for a valid area indicated by the delayed image valid-area signal, and the determination is sent as a chromatic determination signal. The chromatic determination circuit 212 can be configured to store the determination result in the memory 212a only when the determination valid-area signal generated by the determination valid-area signal-generation circuit 213 and the delayed image valid-area signal generated by the delay circuit 211 are active.

The chromatic determination circuit 212 determines whether an image signal is a chromatic color or an achromatic color as follows. For each RGB signal, for example, 16 pixels are added as one block respectively in the main scan direction, an average (Ave_R, Ave_G, Ave_B) for each block unit and a maximum (Max_A) and a minimum (Min_A) of the average of each color is calculated. For each block, a difference between the maximum and the minimum is compared with a parameter (threshold-tha) that can be set. The color is determined to be chromatic based on the following inequality:

$$Max\_A - Min\_A > tha$$

When the above inequality is satisfied, the corresponding block is determined as a chromatic color. Accuracy of the decision can be improved by first-in first-out (FIFO) and detecting a continuation of chromatic color conditions in a sub scan direction.

The memory 212a stores a result determined by the chromatic determination circuit 212 as to whether each line in the main scan direction is a chromatic color or an achromatic color.

Figure 4:
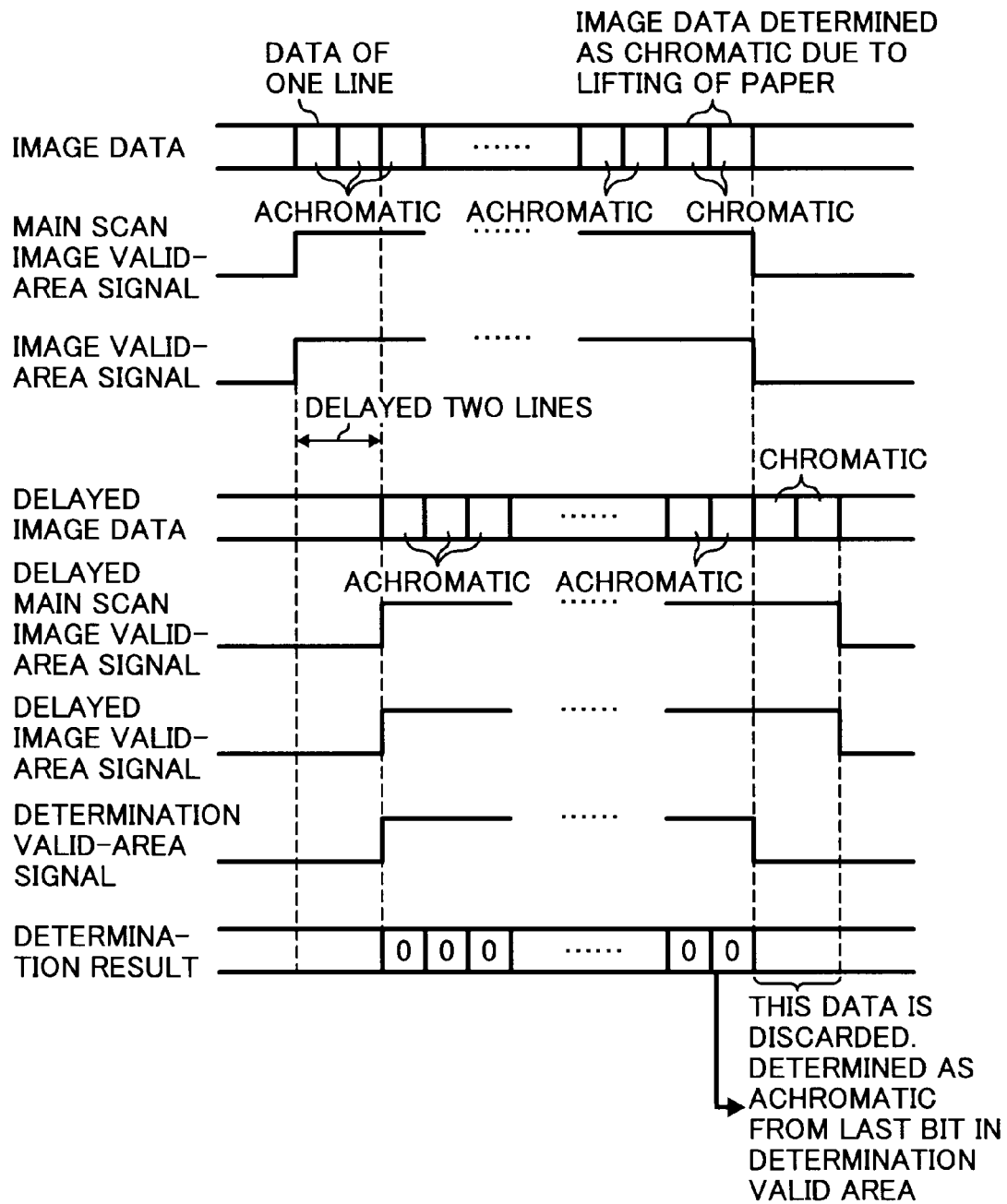
FIG. 4 is timing chart of a chromatic determination processing procedure performed by the image processing unit shown in FIG. 3.
Figure 5:
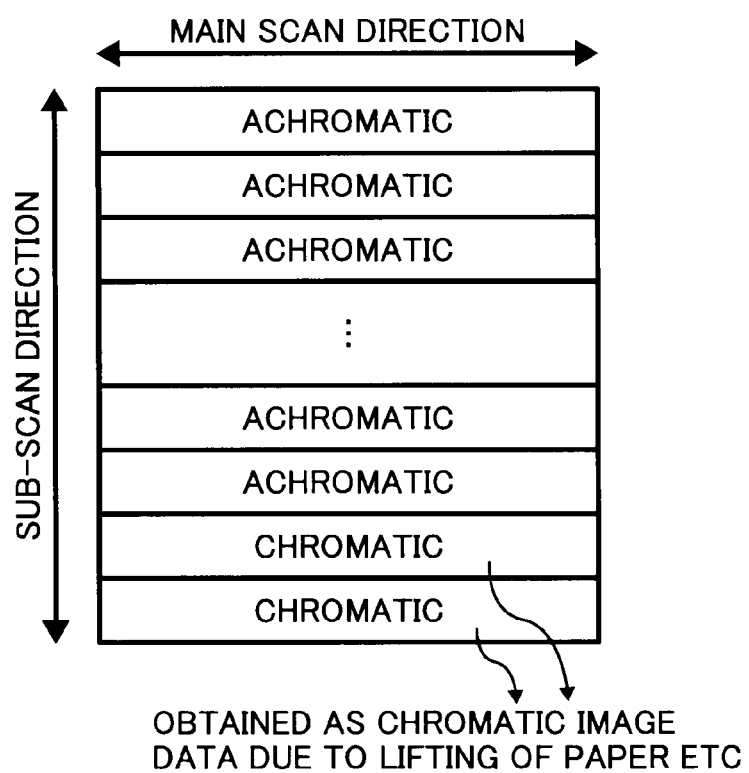
FIG. 5 depicts an example of an original read by a scanner shown in FIG. 1.

FIG. 4 is timing chart of a chromatic determination processing procedure performed by the image processing unit 21. FIG. 5 depicts an example of an original read by the scanner 300. Although the whole original shown in FIG. 5 is actually an achromatic color, an end edge area of image data of the original (last two lines) is read as a chromatic color. This occurs when an end edge of the original is lifted when passing through the ADF 60, because the original is of an irregular size, or originals of different sizes are mixed.

Image data, a main-scan image valid-area signal, and an image valid-area signal are sent out to the delay circuit 211. The delay circuit 211 delays each of the data by a predetermined number of lines. The predetermined number of lines is set in advance for each image forming apparatus. In the first embodiment, two lines of data are delayed.

The delay circuit 211 sends to the chromatic determination circuit 212, the image data that is delayed (hereinafter, delayed image data), the main-scan image valid-area signal that is delayed (hereinafter, delayed main-scan image valid-area signal), and an image valid-area signal that is delayed (hereinafter, delayed image valid-area signal), each of the data being delayed by two lines.

The determination valid-area signal-generation circuit 213 generates a determination valid-area signal from an image valid-area signal and a delayed image valid-area signal sent from the delay circuit 211. Specifically, a logical AND operation is performed between the image valid-area signal and the delayed image valid-area signal.

The chromatic determination circuit 212 determines whether each line of the delayed image data in a main scan direction is a chromatic color or an achromatic color, based on the delayed image data. Further, a logical OR operation is performed between the determination result of a former line, and the OR result is stored in the memory 212a. In the first embodiment, 0 is stored when one line of image data is determined as an achromatic color, and 1 is stored when one line of image data is determined as a chromatic color.

The chromatic determination circuit 212 refers to a determination result for a last bit stored in the memory 212a by referring a corresponding determination valid-area signal sent from the determination valid-area signal-generation circuit 213. The chromatic determination circuit 212 determines whether an original is a chromatic color or an achromatic color based on the determination result for the last bit. The last bit is 0, and therefore, the chromatic determination circuit 212 determines that the original is an achromatic color, and sends data indicating that a chromatic determination signal is inactive.

A determination result can be stored in the memory 212a without performing the logical OR operation, and the chromatic determination circuit 212 can determine whether an original is chromatic or achromatic from a determination result for an area corresponding to a determination valid-area signal among the determination results stored in the memory 212a.

Accordingly, when a color of an edge area of an original read in a sub scan direction is erroneously determined because the end edge of the original is lifted when passing through the ADF 60, the error is not applied in determining whether the original is chromatic or achromatic. Thus, the determination can be made appropriately even when the original is of an irregular size, or originals of different sizes are mixed.

Figure 6:
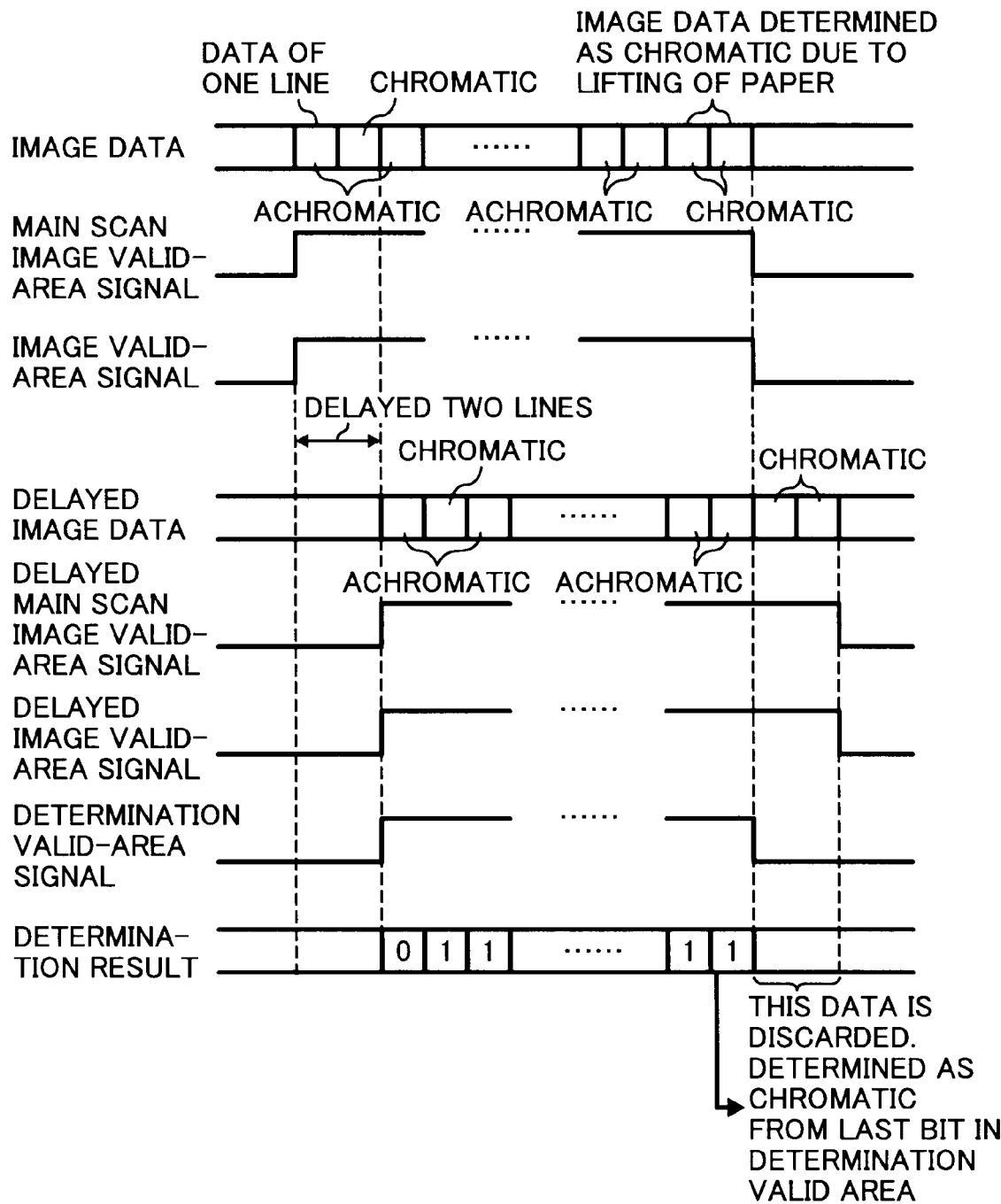
FIG. 6 is timing chart of a chromatic determination processing procedure performed by the image processing unit shown in FIG. 3.
Figure 7:
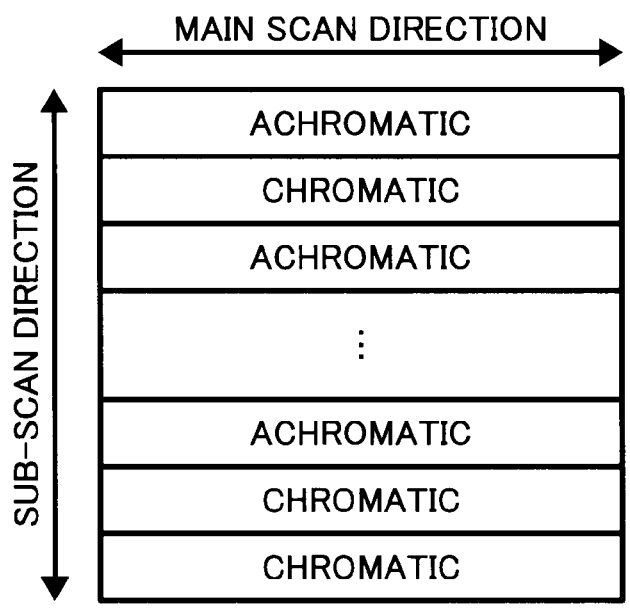
FIG. 7 depicts another example of an original read by the scanner.

An original is determined as a chromatic color as described below. FIG. 6 is timing chart of a chromatic determination processing procedure performed by the image processing unit 21. FIG. 7 depicts an example of an original read by the scanner 300. A second line of image data of the original is a chromatic color, and the last two lines from the end edge are read as image data of a chromatic color.

Image data, a main-scan image valid-area signal, and an image valid-area signal are sent to the delay circuit 211. The delay circuit 211 delays each of the data by a predetermined number of lines, i.e., by two lines in the first embodiment. The image-data is sent, as shown in FIG. 6, as achromatic, chromatic, achromatic, . . . , achromatic, achromatic, chromatic, chromatic.

The delay circuit 211 sends to the chromatic determination circuit 212, delayed image data, a delayed main-scan image valid-area signal, and a delayed image valid-area signal, each of the data being delayed by two lines.

The determination valid-area signal-generation circuit 213 generates a determination valid-area signal from an image valid-area signal and a delayed image valid-area signal sent from the delay circuit 211. Specifically, a logical AND operation is performed between the image valid-area signal and the delayed image valid-area signal.

The chromatic determination circuit 212 determines whether each line of image data of the delayed image data in a main scan direction is a chromatic color or an achromatic color. Further, a logical OR operation is performed between the determination result of a former line, and the OR result is stored in the memory 212a. A determination result for a second line is 1 and a determination result for a third line is 0, however, a logical OR operation is performed between 1 and 0, so the determination result for the third line stored in the memory 212a is 1. Similarly, determination results for the fourth line onwards are stored as 1.

The chromatic determination circuit 212 refers to a determination result for a last bit stored in the memory 212a by referring a corresponding determination valid-area signal sent from the determination valid-area signal-generation circuit 213. The chromatic determination circuit 212 determines whether an original is a chromatic color or an achromatic color based on the determination result for the last bit. The last bit is 1, and therefore, the chromatic determination circuit 212 determines that the original is a chromatic color, and sends data indicating that a chromatic determination signal is active.

A determination result can be stored in the memory 212a without performing the logical OR operation, and the chromatic determination circuit 212 can determine whether an original is chromatic or achromatic from a determination result for an area stored in the memory 212a corresponding to a determination valid-area signal.

Accordingly, when there is image data of a chromatic color within a determination valid area in an original, it can be appropriately determined whether the original is chromatic or achromatic, even when the original is of an irregular size, or originals of different sizes are mixed.

Figure 8:
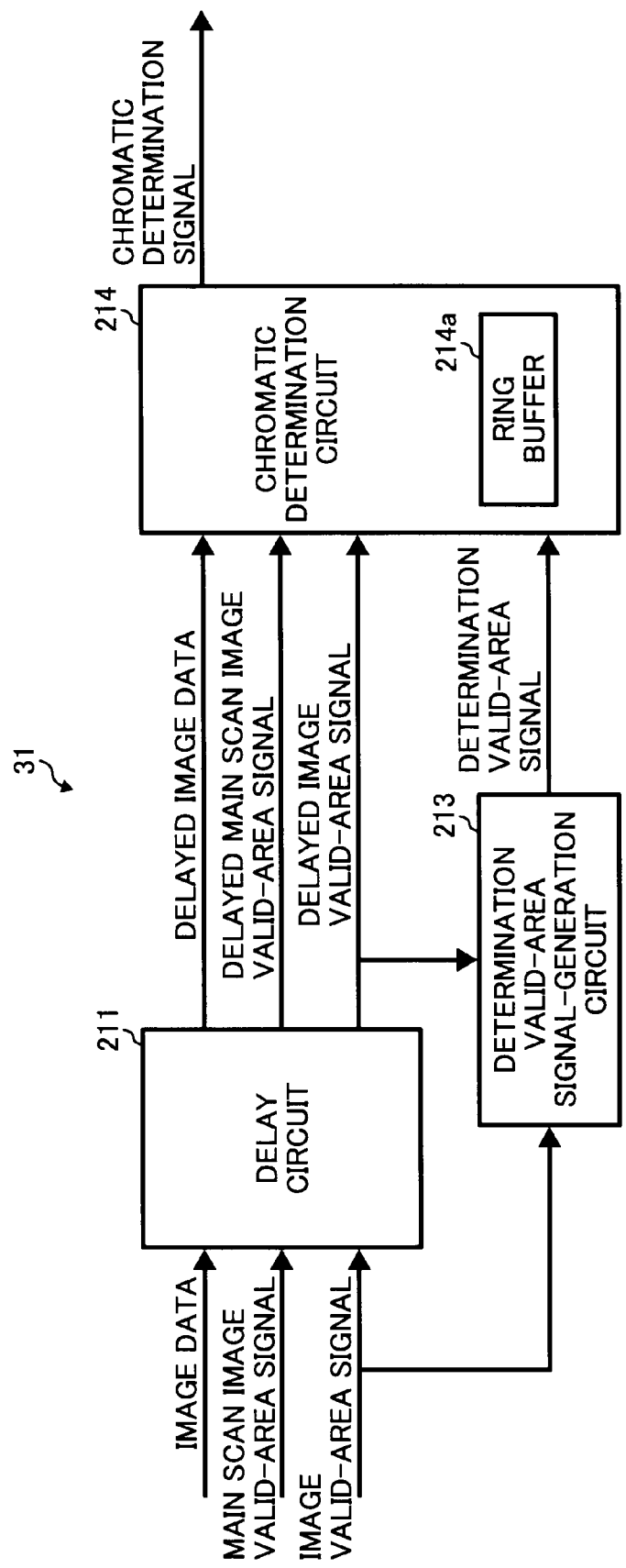
FIG. 8 is a detailed block diagram of an image processing unit according to a second example of the first embodiment.

FIG. 8 is a block diagram of an image processing unit 31 according to a second example of the first embodiment. The difference between the image processing unit 21 shown in FIG. 3 and the image processing unit 31 is that a ring buffer 214a for storing a determination result is included in a chromatic determination circuit 214 instead of the memory 212a.

A processing procedure performed by the image processing unit 31 for determining whether a document is chromatic or achromatic is almost the same as that described with reference to FIGS. 4 and 5, and therefore, overlapping descriptions are omitted.

The memory 212a requires a number of bits equal to or more than the number of lines in a sub scan direction of image data of an original. However, in the present example, the ring buffer 214a of eight bits, for example, stores determination results. When a determination result exceeding eight bits is stored, the determination result of seven lines earlier is overwritten to store a new determination result.

The ring buffer 214a including a certain number of bits stores determination results showing whether each line is chromatic or achromatic, and unnecessary results are overwritten, so that a memory capacity can be reduced.

Figure 9:
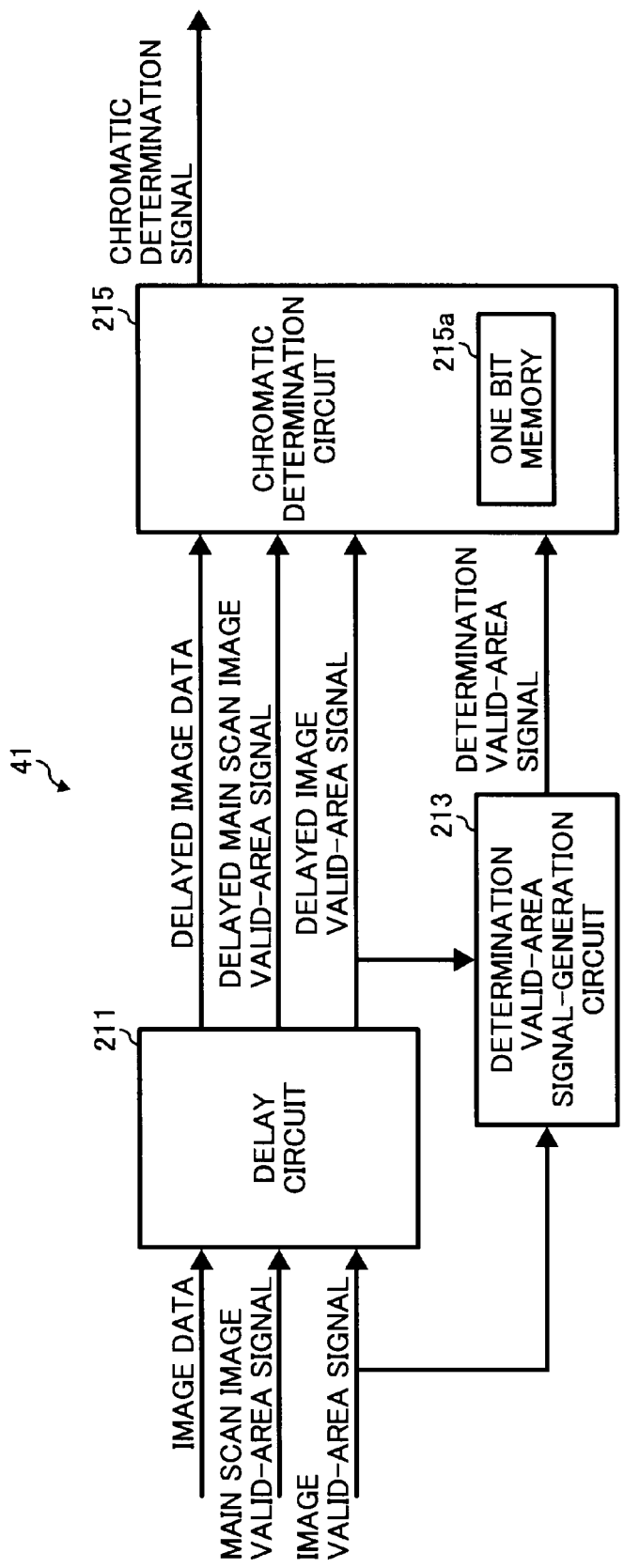
FIG. 9 is a detailed block diagram of an image processing unit according to a third example of the first embodiment.

FIG. 9 is a block diagram of an image processing unit 41 according to a third example of the first embodiment. The difference between the image processing unit 21 shown in FIG. 3 and the image processing unit 41 is that a one bit memory 215a for storing a determination result is included in a chromatic determination circuit 215 instead of the memory 212a. A processing procedure performed by the image processing unit 41 for determining whether a document is chromatic or achromatic is almost the same as that described with reference to FIGS. 4 and 5, and therefore, overlapping descriptions are omitted.

The memory 212a requires a number of bits equal to or more than the number of lines in a sub scan direction of image data of an original. However, in the present example, a determination result for one line is stored in the one bit memory 215a. A logical OR operation is performed between a determination result of a former line stored in the one bit memory 215a and a current determination result, and the OR result is stored in the one bit memory 215a. Accordingly, information for determining whether an original is chromatic or achromatic can be stored with only one bit, so that a memory capacity can be reduced.

To prevent an erroneous determination based on an end edge area of an original that was lifted when passing through the ADF 60, the end edge area needs to be masked from detection. However, when an original of a regular size is passed through the ADF 60, because a size in the sub scan direction is predefined, a position of the last line can be counted so that the masking is unnecessary. On the other hand, when the original is an irregular size or when originals of different sizes are mixed, the end edge of the original is determined by a signal detected by the ADF 60, which defines the size in the sub scan direction. In this case, even when the original is achromatic, it might be erroneously determined as chromatic based on data detected for some lines at the end edge area. It is rare that an original is colored only at the end edge area, so a detection area is preferably set to exclude the end edge area for determining whether an original is chromatic or achromatic.

To realize this operation, a unit that electronically sets the mask on color detection signals and a unit that detects a negate interruption by an fgate is provided. The mask is set when a negate interruption of the fgate is detected to prevent an erroneous detection. However, the processing is delayed when the mask is set electronically, and therefore, when an amount of delay of a line memory is small, the mask cannot be set appropriately at the end edge area.

Thus, the present invention employs the delay circuit to delay image data, so that determination results of lines at an end edge area are not applied. An erroneous detection is masked for the end edge area corresponding to a number of lines delayed.

Figure 10:
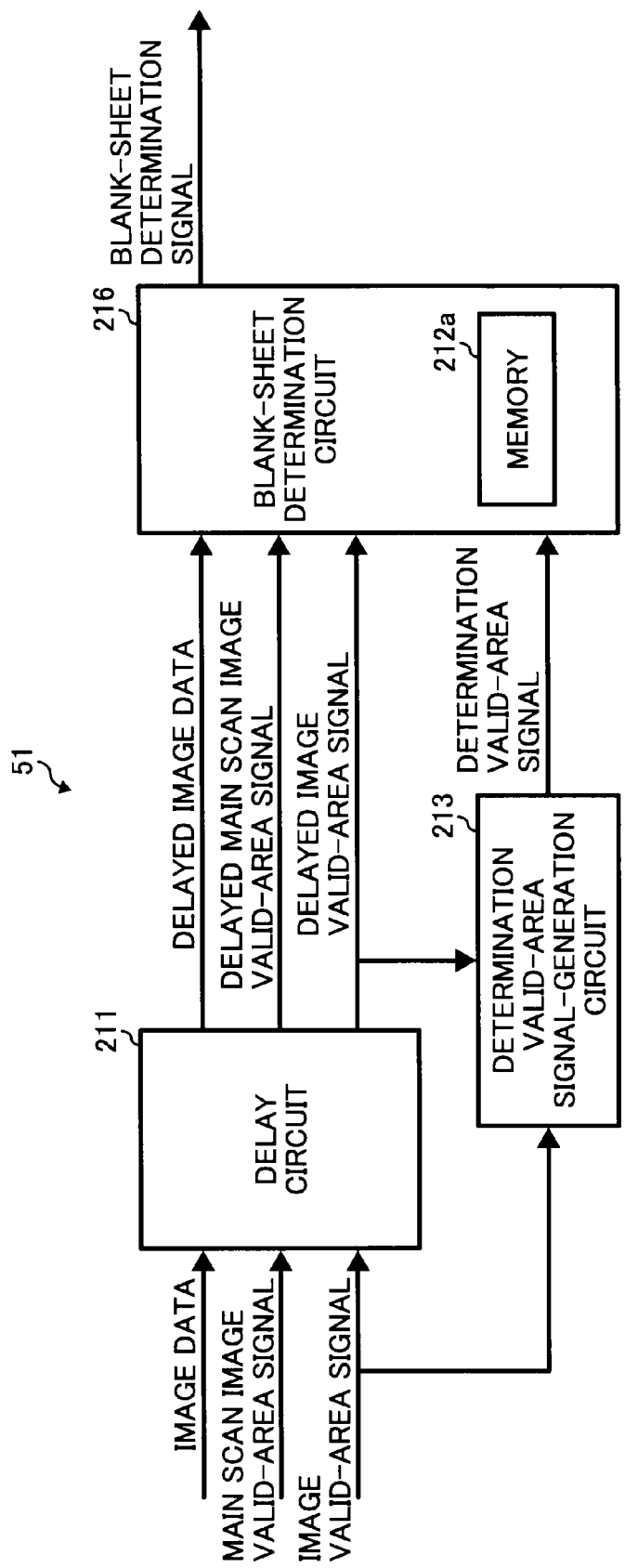
FIG. 10 is a detailed block diagram of an image processing unit shown in FIG. 1 according to a second embodiment of the present invention.

FIG. 10 is a block diagram of an image processing unit 51 according to a second embodiment of the present invention.

The image processing unit 51 includes the delay circuit 211, a blank-sheet determination circuit 216, the memory 212a, and the determination valid-area signal-generation circuit 213. Configurations and functions of the delay circuit 211, the memory 212a, and the determination valid-area signal-generation circuit 213 are the same as those of the first embodiment, and therefore, overlapping descriptions are omitted.

The blank-sheet determination circuit 216 determines whether image data of each line of the delayed image data in a main scan direction is blank or not blank. Further, a logical OR operation is performed between the determination result of a former line, and the OR result is stored in the memory 212a. In the second embodiment, 0 is stored when one line of image data is determined as blank, and 1 is stored when one line of image data is determined as not blank.

Figure 11:
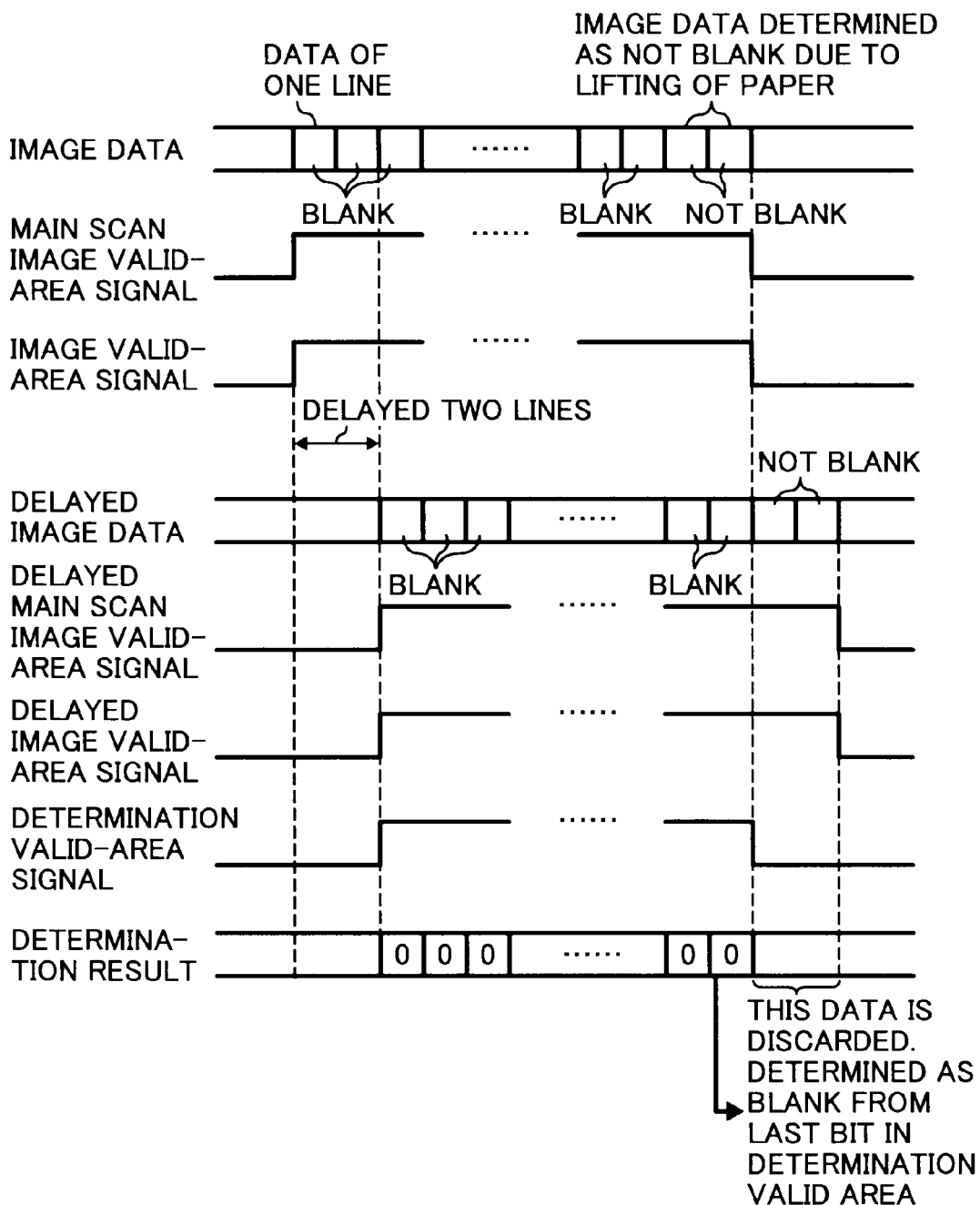
FIG. 11 is timing chart of a blank-sheet determination processing procedure performed by the image processing unit shown in FIG. 10.
Figure 12:
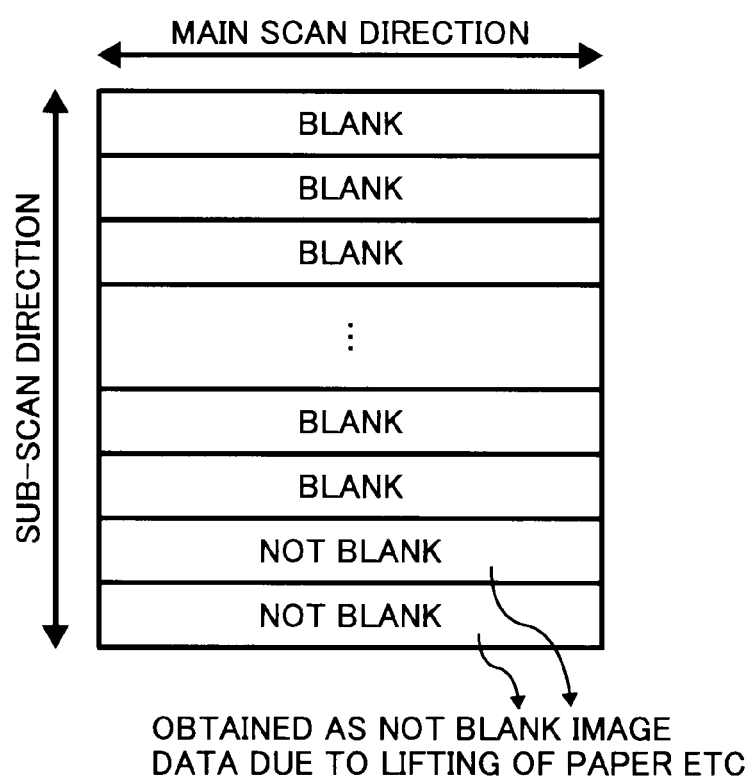
FIG. 12 depicts another example of an original read by a scanner according to the second embodiment.

FIG. 11 is timing chart of a blank-sheet determination processing procedure performed by the image processing unit 51. FIG. 12 depicts an example of an original read by the scanner 300. Although the original shown in FIG. 12 is actually blank, two lines from an end edge of image data of the original is read as not blank. This occurs when an end edge of the original is lifted when passing through the ADF 60 because the original is of an irregular size or originals of different sizes are mixed when reading the original.

Image data, a main-scan image valid-area signal, and an image valid-area signal are sent to the delay circuit 211. The delay circuit 211 delays each of the data by a predetermined number of lines. The predetermined number of lines is set in advance for each image forming apparatus. In the second embodiment, two lines of data are delayed.

The delay circuit 211 sends to the blank-sheet determination circuit 216, delayed image data, a delayed main-scan image valid-area signal, and a delayed image valid-area signal, each of the data being delayed by two lines.

The determination valid-area signal-generation circuit 213 generates a determination valid-area signal from an image valid-area signal and a delayed image valid-area signal sent from the delay circuit 211. Specifically, a logical AND operation is performed between the image valid-area signal and the delayed image valid-area signal.

The blank-sheet determination circuit 216 determines whether each line of the delayed image data in a main scan direction is blank or not blank. Further, a logical OR operation is performed between the determination result of a former line, and the OR result is stored in the memory 212a. In the second embodiment, 0 is stored when one line of image data is determined as blank, and 1 is stored when one line of image data is determined as not blank. The determination can be performed not only by one line, but can be performed by a plurality of lines.

The blank-sheet determination circuit 216 refers to a determination result for a last bit stored in the memory 212a by referring a corresponding determination valid-area signal sent from the determination valid-area signal-generation circuit 213. The blank-sheet determination circuit 216 determines whether an original is blank or not blank based on the determination result for the last bit. The last bit is 0, and therefore, the blank-sheet determination circuit 216 determines that the original is blank, and sends data indicating that a blank-sheet determination signal is inactive.

A determination result can be stored in the memory 212a without performing the logical OR operation, and the blank-sheet determination circuit 216 can determine whether an original is blank or not blank from a determination result for an area corresponding to a determination valid-area signal among the determination results stored in the memory 212a.

The memory 212a can be a ring buffer or a one bit memory as in the other examples of the first embodiment. Further, instead of the blank-sheet determination circuit 216, a non-blank-sheet determination circuit can be employed for determining whether an original is blank or not blank.

Accordingly, when an erroneous determination is made for an edge area of an original read in a sub scan direction because the end edge of the original is lifted when passing through the ADF 60, the error is not applied in determining whether the original is blank or not blank. Thus, the determination can be made appropriately as to whether the original is blank or not blank, even when the original is of an irregular size, or originals of different sizes are mixed.

Figure 13:
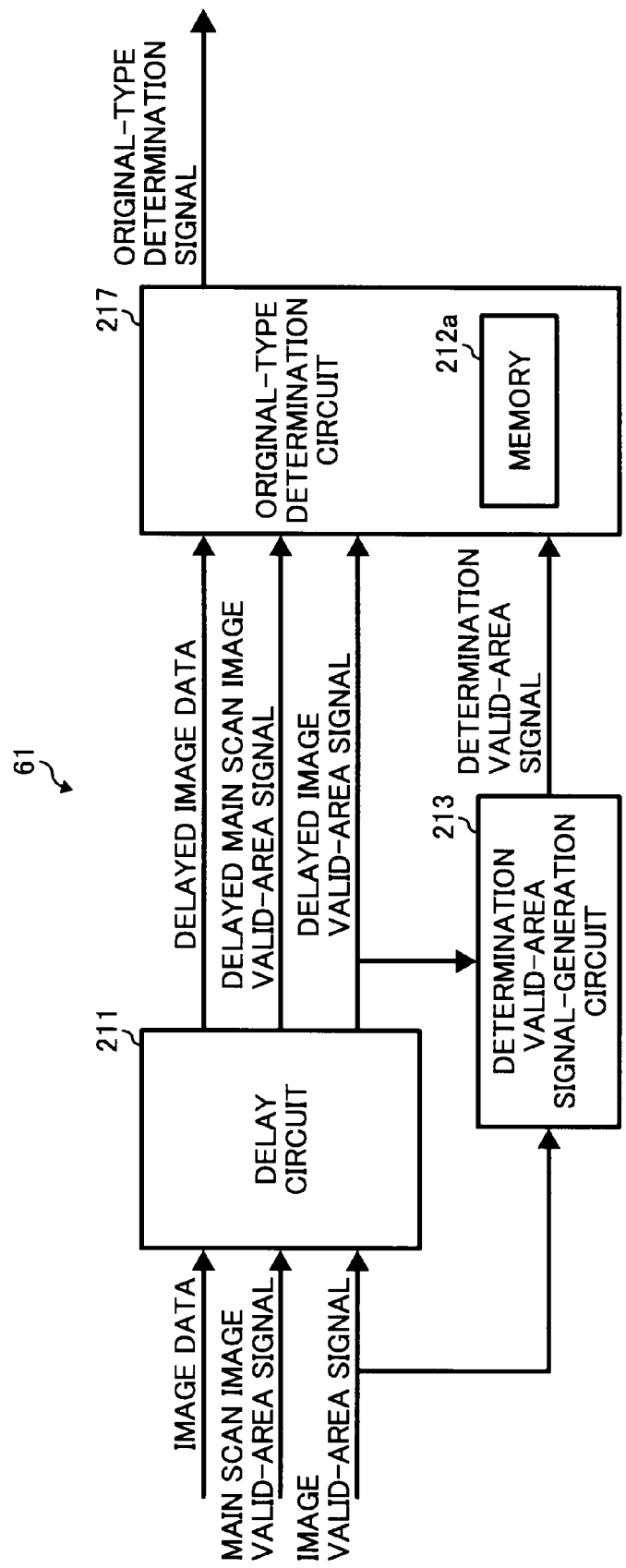
FIG. 13 is a detailed block diagram of an image processing unit shown in FIG. 1 according to a third embodiment of the present invention.

FIG. 13 is a block diagram of an image processing unit 61 according to a third embodiment of the present invention.

The image processing unit 61 includes the delay circuit 211, an original-type determination circuit 217, the memory 212a, and the determination valid-area signal-generation circuit 213. Configurations and functions of the delay circuit 211, the memory 212a, and the determination valid-area signal-generation circuit 213 are the same as those of the first embodiment, and therefore, overlapping descriptions are omitted.

The original-type determination circuit 217 determines whether image data of each line of the delayed image data in a main scan direction is a predetermined original type or not a predetermined original type. Further, a logical OR operation is performed between the determination result of a former line, and the OR result is stored in the memory 212a. In the third embodiment, 1 is stored when one line of image data is determined as a predetermined original type, and 0 is stored when one line of image data is determined as not a predetermined original type. The determination can be made not only by one line, but can be made by a plurality of lines.

Figure 14:
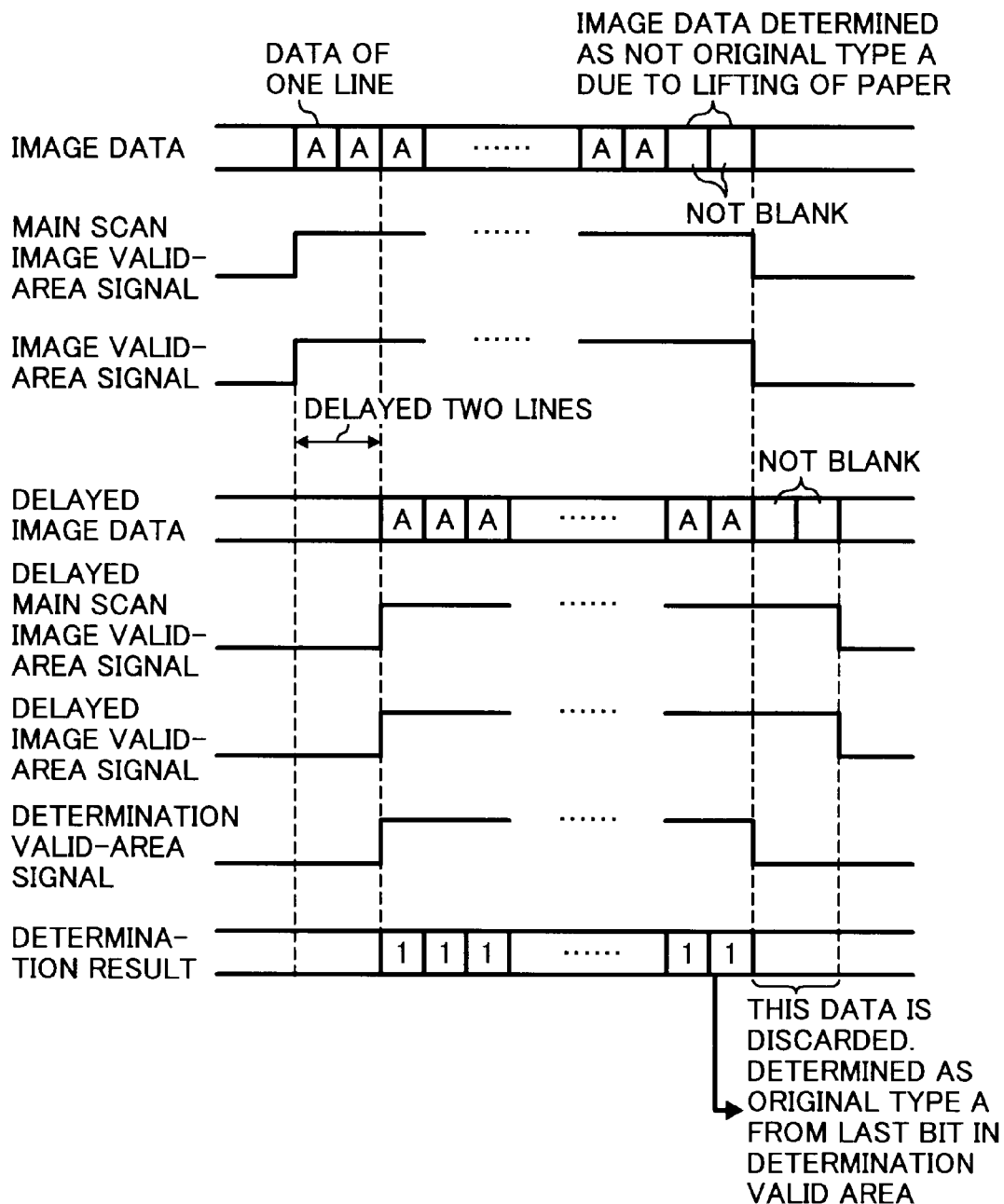
FIG. 14 is timing chart of an original-type determination processing procedure performed by the image processing unit shown in FIG. 13.

FIG. 14 is timing chart of an original-type determination processing procedure performed by the image processing unit 61. FIG. 15 depicts an example of an original read by the scanner 300. Although the original shown in FIG. 15 is actually an original type A, two lines from an end edge of image data of the original is read as not the original type A. This occurs when an end edge of the original is lifted when passing through the ADF 60 because the original is of an irregular size, or originals of different sizes are mixed when reading the original.

Image data, a main-scan image valid-area signal, and an image valid-area signal are sent to the delay circuit 211. The delay circuit 211 delays each of the data by a predetermined number of lines. The predetermined number of lines is set in advance for each image forming apparatus. In the third embodiment, two lines of data are delayed.

The delay circuit 211 sends to the original-type determination circuit 217, delayed image data, a delayed main-scan image valid-area signal, and a delayed image valid-area signal, each of the data being delayed by two lines.

The determination valid-area signal-generation circuit 213 generates a determination valid-area signal from an image valid-area signal and a delayed image valid-area signal sent from the delay circuit 211. Specifically, a logical AND operation is performed between the image valid-area signal and the delayed image valid-area signal.

The original-type determination circuit 217 determines whether each line of the delayed image data in a main scan direction is the original type A or not the original type A. Further, a logical OR operation is performed between the determination result of a former line, and the OR result is stored in the memory 212a. In the third embodiment, 1 is stored when one line of image data is determined as the original type A, and 0 is stored when one line of image data is determined as not the original type A.

The original-type determination circuit 217 refers to a determination result for a last bit stored in the memory 212a by referring a corresponding determination valid-area signal sent from the determination valid-area signal-generation circuit 213. The original-type determination circuit 217 determines whether an original is the original type A or not the original type A based on the determination result for the last bit. The last bit is 1, and therefore, the original-type determination circuit 217 determines that the original is the original type A, and sends data indicating that an original type determination signal is active.

A determination result can be stored in the memory 212a without performing the logical OR operation, and the original-type determination circuit 217 can determine whether an original is the original type A or not original type A from a determination result for an area corresponding to a determination valid-area signal among the determination results stored in the memory 212a. The memory 212a can be a ring buffer or a one bit memory as in the other examples of the first embodiment.

Accordingly, when an erroneous determination is made for an edge area of an original read in a sub scan direction because the end edge of the original is lifted when passing through the ADF 60, the error is not applied in determining whether the original is the original type A or not the original type A. Thus, the determination can be made appropriately even when the original is of an irregular size, or originals of different sizes are mixed.

According to the present invention, a predetermined end edge area of an original in a sub scan direction is masked from detection, and an arbitrarily set number of lines in the sub scan direction are detected to determine whether image data of the document is chromatic or achromatic, or blank or not blank, or a predetermined original type or not a predetermined original type. Thus, an erroneous determination can be prevented, even when the original is of an irregular size or originals of different sizes are mixed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
    a conveying unit that conveys an original;
    a scanning unit that scans the conveyed original line by line to generate image information including image data corresponding to a plurality of lines;
    a detecting unit that detects, for each of the lines, whether image data in each of the lines, in the generated image information is chromatic or achromatic;
    a determining unit that determines whether the entire original is chromatic or achromatic based on only a detection result of the detecting unit for a first area of the image information, the first area including at least one of the plurality of lines, excluding a detection result for a predetermined second area of the image information, the predetermined second area including an end line among the lines scanned in a scanning direction of the original; and
    a storing unit that stores a detection result of the detecting unit;
    wherein the determining unit determines whether the original is chromatic or achromatic based on a detection result for the first area stored in the storing unit.

2. The image processing apparatus according to claim 1, wherein the scanning unit outputs a timing signal indicative of a timing of outputting the image information, the image processing apparatus further comprising:
    a delaying unit that receives the image information from the scanning unit, and outputs the image information at a delayed timing, and outputs a delay timing signal indicative of the delayed timing; and
    a generating unit that generates a valid timing signal indicative of a timing at which image information of the first area is to be output based on the timing signal and the delay timing signal; wherein the detecting unit detects whether the image information output by the delaying unit is chromatic or achromatic based on one line in a main scan direction of the image information,
    the storing unit stores a detection result based on the detecting of one line of the detecting unit, and
    the determining unit determines whether the original is chromatic or achromatic based on the detection result corresponding to the valid timing signal stored in the storing unit.

3. The image processing apparatus according to claim 2, further comprising:
    a calculating unit that performs logical addition between a detection result of the detecting unit and a newest detection result stored in the storing unit, wherein
    the storing unit stores a calculation result of the calculating unit as a detection result,
    and
    the determining unit determines whether the original is chromatic or achromatic based on a last detection result corresponding to the valid timing signal stored in the storing unit.

4. The image processing apparatus according to claim 3, wherein the storing unit is a ring buffer.

5. The image processing apparatus according to claim 3, wherein the storing unit is a one bit memory.

6. The image processing apparatus according to claim 1, wherein
    the detecting unit detects whether the image information generated by the scanning unit is chromatic or achromatic by one line in a main scan direction of the image information.

7. An image forming apparatus comprising the image processing apparatus according to claim 1.

8. An image processing apparatus comprising:
    a conveying unit that conveys an original;
    a scanning unit that scans the conveyed original line by line to generate image information including image data corresponding to a plurality of lines;
    a detecting unit that detects, for each of the lines, whether image data in each of the lines in the generated image information is blank or not blank; and
    a determining unit that determines whether the entire original is blank or not blank based on only a detection result of the detecting unit for a first area of the image information, the first area including at least one line of the plurality of lines, excluding a detection result for a predetermined second area of the image information, the predetermined second area including an end line among the lines scanned in a scanning direction of the original; and
    a storing unit that stores a detection result of the detecting unit, wherein the determining unit determines whether the original is blank or not blank based on a detection result for the first area stored in the storing unit.

9. The image processing apparatus according to claim 8, wherein
    the scanning unit outputs a timing signal indicative of a timing of outputting the image information, the image processing apparatus further comprising:
    a delaying unit that receives the image information from the scanning unit, and outputs the image information at a delayed timing, and outputs a delay timing signal indicative of the delayed timing; and
    a generating unit that generates a valid timing signal indicative of a timing at which image information of the first area is to be output based on the timing signal and the delay timing signal, wherein the detecting unit detects whether the image information output by the delaying unit is blank or not blank based on one line in a main scan direction of the image information, the storing unit stores a detection result based on the detecting of one line by the detecting unit, and the determining unit determines whether the original is blank or not blank based on the detection result corresponding to the valid timing signal stored in the storing unit.

10. The image processing apparatus according to claim 9, further comprising:

a calculating unit that performs logical addition between a detection result of the detecting unit and a newest detection result stored in the storing unit, wherein the storing unit stores a calculation result of the calculating unit as a detection result, and the determining unit determines whether the original is blank or not blank based on a last detection result corresponding to the valid timing signal stored in the storing unit.

11. The image processing apparatus according to claim 10, wherein the storing unit is a ring buffer.

12. The image processing apparatus according to claim 10, wherein the storing unit is a one bit memory.

13. The image processing apparatus according to claim 8, wherein the detecting unit detects whether the image information generated by the scanning unit is blank or not blank by one line in a main scan direction of the image information.

14. An image forming apparatus comprising the image processing apparatus according to claim 8.

15. An image processing apparatus comprising:

a conveying unit that conveys an original;

a scanning unit that scans the conveyed original line by line to generate image information including image data corresponding to a plurality of lines;

a detecting unit that detects, for each of the lines, whether image data in the generated image information is a predetermined original type or not a predetermined original type; and a determining unit that determines whether the original is a predetermined original type or not a predetermined original type based on a detection result of the detecting unit for a first area of the image information, the first area including at least one line of the plurality of lines, excluding a detection result for a predetermined second area of the image information, the predetermined second area including an end line among the lines scanned in a scanning direction of the original; and a storing unit that stores a detection result of the detecting unit, wherein the determining unit determines whether the original is a predetermined original type or not a predetermined original type based on a detection result for the first area stored in the storing unit.

16. The image processing apparatus according to claim 15, wherein the scanning unit outputs a timing signal indicative of a timing of outputting the image information, the image processing apparatus further comprising:

a delaying unit that receives the image information from the scanning unit, and outputs the image information at a delayed timing, and outputs a delay timing signal indicative of the delayed timing; and a generating unit that generates a valid timing signal indicative of a timing at which image information of the first area is to be output based on the timing signal and the delay timing signal, wherein the detecting unit detects whether the image information output by the delaying unit is a predetermined original type or not a predetermined original type based on one line in a main scan direction of the image information, the storing unit stores a detection result based on the detecting of one line by the detecting unit, and the determining unit determines whether the original is a predetermined original type or not a predetermined original type based on the detection result corresponding to the valid timing signal stored in the storing unit.

17. The image processing apparatus according to claim 16, further comprising:

a calculating unit that performs logical addition between a detection result of the detecting unit and a newest detection result stored in the storing unit, wherein the storing unit stores a calculation result of the calculating unit as a detection result, and the determining unit determines whether the original is a predetermined original type or not a predetermined original type based on a last detection result corresponding to the valid timing signal stored in the storing unit.

18. The image processing apparatus according to claim 17, wherein the storing unit is a ring buffer.

19. The image processing apparatus according to claim 17, wherein the storing unit is a one bit memory.

20. An image forming apparatus comprising the image processing apparatus according to claim 15.

21. The image processing apparatus according to claim 15, wherein the detecting unit detects whether the image information generated by the scanning unit is a predetermined original type or not a predetermined original type by one line in a main scan direction of the image information.

* * * * *